United States Patent [19]

Oishi et al.

[11] Patent Number: 5,703,988
[45] Date of Patent: Dec. 30, 1997

[54] COATED OPTICAL FIBER AND FABRICATION PROCESS THEREFOR

[75] Inventors: Kazumasa Oishi; Nobuhiro Akasaka; Tatsuya Kakuta; Yasuo Matsuda, all of Yokohama, Japan

[73] Assignee: Sumitomo Electric Industries, Ltd., Osaka, Japan

[21] Appl. No.: 687,497

[22] PCT Filed: Feb. 14, 1995

[86] PCT No.: PCT/JP95/00207

§ 371 Date: Aug. 6, 1996

§ 102(e) Date: Aug. 6, 1996

[87] PCT Pub. No.: WO95/21800

PCT Pub. Date: Aug. 17, 1995

[30] Foreign Application Priority Data

Feb. 15, 1994 [JP] Japan ................ 6-018561

[51] Int. Cl.⁶ ................ G02B 6/02; G02B 6/22
[52] U.S. Cl. ................ 385/128; 65/435
[58] Field of Search ................ 385/128, 141, 385/81, 55, 62, 87, 100, 103; 359/900; 65/423, 434, 435; 428/378, 429, 447

[56] References Cited

U.S. PATENT DOCUMENTS

| | | | |
|---|---|---|---|
| 4,473,599 | 9/1984 | Elion | 65/423 |
| 4,711,388 | 12/1987 | Winter et al. | 385/100 |
| 4,801,186 | 1/1989 | Wagatsmuma et al. | 385/128 |
| 5,140,661 | 8/1992 | Kerek | 385/81 |
| 5,502,145 | 3/1996 | Szum | 528/28 |
| 5,595,820 | 1/1997 | Szum | 428/378 |

FOREIGN PATENT DOCUMENTS 4-338126  11/1992  Japan.
5-310439  11/1993  Japan.

*Primary Examiner*—Akm E. Ullah
*Attorney, Agent, or Firm*—Beveridge, DeGrandi, Weilacher & Young, LLP

[57] ABSTRACT

A coated optical fiber comprising a light-transmitting fiber and a resin coating layer disposed on the outer periphery of the light-transmitting fiber is formed, an external flaw is imparted to the surface of the resin coating layer while running the coated optical fiber, and then the coated optical fiber is subjected to the measurement of a tensile breaking strength thereof. At this time, the fiber having a strength retention ratio $R_S = S_A / S_0$ of 0.98 or more, wherein $S_A$ is the median value of the tensile breaking strength after the provision of the external flaw, and $S_0$ is the median value of the tensile breaking strength before the provision of the external flaw, is selected as a non-defective product. By using the above process for fabricating a coated optical fiber, it is possible to reduce both of the length and measuring period of time required for the evaluation of the external flaw resistance thereof, and to obtain a coated optical fiber having good characteristics while quantitatively evaluating the external flaw resistance of the fiber.

10 Claims, 9 Drawing Sheets

Fig. 7

(TABLE 1)

| fiber sample No. | primary coating layer/secondary coating layer | | |
|---|---|---|---|
| | coating diameter (μm) | Young's modulus (kg/mm²) | coating thickness (μm) |
| 1 | 150/180 | 0.07/170 | 12.5/15.0 |
| 2 | 160/180 | 0.07/170 | 17.5/10.0 |
| 3 | 170/180 | 0.07/170 | 22.5/5.0 |
| 4 | 150/190 | 0.07/170 | 12.5/20.0 |
| 5 | 160/190 | 0.07/170 | 17.5/15.0 |
| 6 | 150/200 | 0.07/170 | 12.5/25.0 |
| 7 | 160/200 | 0.07/170 | 17.5/20.0 |
| 8 | 170/200 | 0.07/170 | 22.5/15.0 |
| 9 | 180/220 | 0.07/170 | 27.5/20.0 |
| 10 | 180/240 | 0.07/170 | 27.5/30.0 |
| 11 | 150/180 | 0.07/60 | 12.5/15.0 |
| 12 | 150/180 | 0.07/70 | 12.5/15.0 |
| 13 | 150/180 | 0.07/150 | 12.5/15.0 |
| 14 | 150/180 | 0.06/170 | 12.5/15.0 |
| 15 | 150/180 | 0.13/170 | 12.5/15.0 |
| 16 | 180/240 | 0.13/60 | 27.5/30.0 |

Fig. 8

(TABLE 2)

PARTICLE SIZE OF SAND PAPERS (FIVE KINDS)

| # | AVERAGE PARTICLE SIZE (μm) |
|---|---|
| 320 | 40 |
| 400 | 30 |
| 600 | 20 |
| 800 | 14 |
| 1000 | 11.5 |

Fig. 9

(TABLE 3)

| FIBER No. | OUTSIDE DIAMETER OF COATING LAYER ($\mu m \phi$) | TENSILE LOAD FOR EXTERNAL FLAW (g) | RESULTS (CONTINUOUS RUNNING OF 1.0 km OR MORE) |
|---|---|---|---|
| 1 | 250 | 2000 | ○ |
| 2 | 240 | 1000 | ○ |
|   | 240 | 2000 | ○ |
| 3 | 220 | 1000 | ○ |
|   | 220 | 2000 | ○ |
| 4 | 200 | 1000 | ○ |
|   | 200 | 1500 | × |
| 5 | 180 | 500 | × |
|   | 180 | 1000 | × |

COATED OPTICAL FIBER AND FABRICATION PROCESS THEREFOR

TECHNICAL FIELD

The present invention relates to a coated optical fiber, and a process and an apparatus for fabricating a coated optical fiber. More specifically, the present invention relates to a coated optical fiber which is suitably usable as strands for constituting a multi-strand (or multi-count) optical fiber cable, and a process and an apparatus which are capable of efficiently fabricating a coated optical fiber having a good resistance to an external flaw.

BACKGROUND ART

In recent years, for the purpose of meeting the diversification in the demand for communication and of meeting an increase in the communication traffic, the conversion of subscriber lines into optical fiber transmission lines is now in progress, especially in urban areas. At present, the optical communication systems for subscribers are mainly constituted by private systems for handling large-capacity communication such as image data communication, and multi-plexed systems for handling telephone communication and low-speed digital communication, and therefore the number of the optical fibers required for these systems is rather limited.

However, in the near future, when the communication handling the large-capacity information such as image data is generalized so that it is popularized even in ordinary homes, it is predicted that it will become necessary to replace all of the current subscriber lines comprising copper wires, with optical fibers so as to meet the demand of the users.

In order to carry out a design (i.e., Fiber-To-The-Home (FTTH) design) such that all of the wires constituting the above-mentioned subscriber line networks should be replaced with optical fibers, it is necessary to use a cable (multi-strand optical fiber cable) containing therein a large number of assembled optical fibers. At present, as an optical fiber cable which is expected to replace a copper wire cable currently used, it has been investigated to introduce an ultra-high-strand (or ultra-high-count) optical fiber cable which has an outside diameter accommodable in a current pipe line (inside diameter: 75 mm) for laying copper wire cables, and also has a number of strands or counts (e.g., 4000 strands) which is comparable to the number of conductor pairs in a current copper wire cable (3600 pairs) (Tomita et al.; Proceedings of Spring National Conference of the Institute of Electronics, Information and Communication Engineers, B-871, in 1991).

In order to realize such an ultra-high-strand optical fiber cable, it is absolutely necessary to reduce the outside diameter (outside diameter reduction) of a coated optical fiber, whereas at present, the optical fiber cable contains about 1000 strands, and the outside diameter of each strand is 250 µm.

A coated optical fiber comprises a light-transmitting fiber, and a resin coating layer disposed on the outer periphery (or circumference) of the light-transmitting fiber. The coating layer has a function of absorbing pressure externally applied thereto so as to prevent the bending of the light-transmitting fiber and to maintain the light transmission characteristics of the fiber, and also has an important function of preventing an external flaw of the fiber. It is difficult to change the outside diameter of the standardized light-transmitting fiber per se. Therefore, in order to reduce the outside diameter of the coated optical fiber, it is necessary to reduce the thickness of the above-mentioned coating layer.

However, such reduction in the outside diameter of the coated optical fiber or reduction in the coating layer thickness can cause a problem in the quality of the optical fiber, especially, a problem of deterioration in the fiber strength (mechanical characteristic). Such deterioration in the fiber strength not only decreases the productivity of the fiber markedly, but also invites a serious problem in the quality assurance of the optical fiber cable.

Accordingly, in order to reduce the thickness of the coating layer while preventing the external flaw of the light-transmitting fiber (i.e., while maintaining the external flaw resistance of the coating layer), it is extremely important to efficiently fabricate a coated optical fiber having a predetermined quantitative (external) flaw resistance while quantitatively evaluating the flaw resistance of the coating of the optical fiber. Along with the recent demand for the development of a multi-strand optical fiber cable, the importance of the optical fiber having such a predetermined quantitative flaw resistance has been increased more and more.

In general, it is known that the strength of a coated optical fiber depends on a flaw (original flaw) which is originally present in the glass fiber per se, and on a flaw (secondary flaw) which has been induced on the surface of the glass fiber due to the damaging of the coating layer.

Hitherto, the flaw resistance of a coated optical fiber has been measured by a standardized method (falling sand test) as shown in FIG. 5. Referring to FIG. 5, one end of an optical fiber 41 of which flaw resistance is to be measured, is wound about a capstan 42 so as to be fixed thereto. The other end of the fiber 41 is passed over a pulley 43, and then is connected to a predetermined weight 44 (500 grams). When a stopper 45 is opened, an abrasive (alumina particles) 47 contained in a hopper 46 is passed through a hollow guide tube 48 having a smooth inner surface, and then is continuously dropped onto the fiber 41 so as to impart external flaws to the fiber, and thereafter is collected in a collector vessel 49. Immediately after the fiber 41 is broken and the weight 44 is dropped, the stopper 45 is closed, and the weight of the abrasive collected in the collector vessel 49 is measured, whereby the thus measured weight of the abrasive is treated as an index of the flaw resistance of the fiber 41 (EIA Standard, ANSI/EIA RS-455-66, FOP-66 in 1984, Electric Industries Association; International Wire & Cable Symposium Proceedings, 1991, page 428, in 1991).

However, in the above-mentioned conventional measurement method, the flaw resistance of the optical fiber is evaluated by measuring the weight of the abrasive at the time of the fiber breaking due to the collision of the abrasive with a portion of the optical fiber. Accordingly, in this measurement method, it is necessary to wind a new sample fiber around the capstan in the same manner as described above, after the removal of the broken fiber. Accordingly, in the conventional method, it has been necessary to consume a large amount of fiber (a portion of the optical fiber which has not been provided with the external flaws is also consumed wastefully) and a long period of time.

In addition, in the above-mentioned conventional method, a large amount of the fiber and a long period of time are required, and therefore it is difficult to discriminate the original flaw and secondary flaw from each other. On the other hand, according to the present inventors' investigation, it has been found that, in a coated optical fiber having a coating layer with a reduced thickness, the secondary flaw is a more important factor than the original flaw. In other words, it has been found that a decrease in the fiber strength based on the reduction in the outside diameter of an optical fiber is mainly caused by a secondary flaw which is developed when a foreign matter breaks the coating of the optical fiber so that it reaches the surface of the glass fiber.

Further, since the conventional method is a batch-type, the resultant measurement data are liable to be varied in the respective batch of the measurement operations, whereby statistical processing of the resultant flaw resistance data, i.e., the quantitative evaluation of the flaw resistance is practically difficult.

An object of the present invention is to provide a process and an apparatus for fabricating a coated optical fiber, which are capable of efficiently fabricating a coated optical fiber having a predetermined quantitative flaw resistance.

Another object of the present invention is to provide a process and an apparatus for fabricating a coated optical fiber, which are capable of efficiently fabricating a coated optical fiber having a predetermined quantitative flaw resistance, while measuring the flaw resistance of the optical fiber in a short period of time for the measurement.

A further object of the present invention is to provide a process and an apparatus for fabricating a coated optical fiber, which are capable of efficiently fabricating a coated optical fiber having a predetermined quantitative flaw resistance, while quantitatively measuring the flaw resistance of the optical fiber.

A further object of the present invention is to provide a process and an apparatus for fabricating a coated optical fiber, which are capable of efficiently fabricating a coated optical fiber having a predetermined quantitative flaw resistance, while quantitatively measuring the flaw resistance of the optical fiber in a manner such that an original flaw and a secondary flaw are discriminated from each other.

A further object of the present invention is to provide a process and an apparatus for fabricating a coated optical fiber, which are capable of efficiently fabricating a coated optical fiber having a predetermined quantitative flaw resistance, while continuously measuring the quantitative flaw resistance of the optical fiber.

A further object of the present invention is to provide a coated optical fiber, which is suitably usable for a multi-strand optical fiber cable.

A still further object of the present invention is to provide a coated optical fiber, wherein the decrease in the flaw resistance of the coating layer is minimized so that the coated optical fiber is suitably usable for a multi-strand optical fiber cable.

DISCLOSURE OF INVENTION

According to the present invention, there is provided a process for fabricating a coated optical fiber, comprising:

forming a coated optical fiber comprising a light-transmitting fiber and a resin coating layer disposed on the outer periphery of the light-transmitting fiber;

imparting an external flaw to the surface of the resin coating layer while running the coated optical fiber, and then subjecting the coated optical fiber to the measurement of a tensile breaking strength thereof; and selecting, as a non-defective product, the fiber having a strength retention ratio $R_S = S_A/S_O$ of 0.98 or more, wherein $S_A$ is the median value of the tensile breaking strength after the provision of the external flaw, and $S_O$ is the median value of the tensile breaking strength before the provision of the external flaw.

The present invention also provides a process for fabricating a coated optical fiber, comprising:

forming a coated optical fiber comprising a light-transmitting fiber and a resin coating layer disposed on the outer periphery of the light-transmitting fiber;

imparting an external flaw to the surface of the resin coating layer under the application of a tension while running the coated optical fiber; and selecting, as a non-defective product, the fiber which has traveled a predetermined length without causing the breaking thereof.

The present invention further provides an apparatus for fabricating a coated optical fiber, comprising, at least:

coated optical fiber forming means for forming a coated optical fiber comprising a light-transmitting fiber and a resin coating layer disposed on the outer periphery of the light-transmitting fiber; and external flaw-imparting means for imparting an external flaw to the surface of the resin coating layer under the application of a tension while running the coated optical fiber;

whereby the fiber which has traveled a predetermined length without causing the breaking thereof is selected as a non-defective product.

The present invention further provides a coated optical fiber comprising a light-transmitting fiber and a resin coating layer disposed on the outer periphery of the light-transmitting fiber; said coated optical fiber having a strength retention ratio $R_S = S_A/S_O$ ($S_A$: median value of tensile breaking strength after the provision of the external flaw, $S_O$: median value of tensile breaking strength before the provision of the external flaw) of 0.98 or more, when an external flaw is imparted to the surface of the resin coating layer by use of a roller having a surface to which a sand paper of #400 has been bonded, while running the coated optical fiber, and thereafter the tensile breaking strength of the coated optical fiber is measured.

The present invention further provides a coated optical fiber comprising a light-transmitting fiber and a resin coating layer disposed on the outer periphery of the light-transmitting fiber; said coated optical fiber being capable of continuously traveling 1.0 km or more without causing the breaking thereof, when an external flaw is imparted to the surface of the resin coating layer under the application of a tension of 2000 gram-weight by use of a roller having an unevenness on its surface, while running the coated optical fiber at a linear velocity of 100 m/min. to 600 m/min.

The present invention further provides a method of measuring the external flaw resistance of a coated optical fiber, comprising: imparting an external flaw to the surface of the resin coating layer of a coated optical fiber comprising a light-transmitting fiber and a resin coating layer disposed on the outer periphery of the light-transmitting fiber while running the coated optical fiber; and then subjecting the coated optical fiber to the measurement of a tensile breaking strength thereof.

The present invention further provides an apparatus for measuring the external flaw resistance of a coated optical fiber comprising a light-transmitting fiber and a resin coating layer disposed on the outer periphery of the light-transmitting fiber, wherein an external flaw is imparted to the surface of the resin coating layer of the coated optical fiber while running the coated optical fiber thereby to measure the tensile breaking strength of the coated optical fiber.

In the above-mentioned conventional process for fabricating for an optical fiber, abrasive particles are dropped onto a specific portion of a fixed coated optical fiber (batch-type provision of an external flaw), and the weight of the abrasive particles at the time of the fiber breaking is measured. On the other hand, in the above-mentioned process for fabricating a coated optical fiber according to the present invention, while the optical fiber to be measured is caused to run, an external flaw is instantaneously imparted to the coating layer of the optical fiber, and thereafter the breaking strength of the optical fiber is measured. Accordingly, the length of the optical fiber to be subjected to the above test may be minimized (the amount of the consumed fiber corresponding to a portion which is actually not provided with the external flaw is small), and the period of time required for the measurement is also short. As a result, the process according to the present invention may be utilized in a production line for an optical fiber very easily. In addition, in the present invention, since the external flaw is continuously imparted to the coating layer, it is very easy to statistically process the resultant measurement data.

In an embodiment of the present invention wherein the flaw resistance of the coated optical fiber is evaluated by use of a strength retention ratio $R_S = S_A/S_O$ ($S_A$: median value of the breaking strength after the provision of the external flaw, $S_O$: median value of the breaking strength before the provision of an external flaw), the resultant data can be processed statistically, whereby the flaw resistance of the coated optical fiber can be evaluated while substantially removing the effect of an original flaw which can be present in the glass fiber per se constituting the coated optical fiber.

BRIEF DESCRIPTION OF DRAWINGS

FIG. 7 (Table 1) is a table showing the structures of the coated optical fibers fabricated in Example 1.

FIG. 8 (Table 2) is a table showing a relationship between the grade (#) of sand papers which are usable for imparting an external flaw to a coated optical fiber, and the average particle size of particles constituting the sand papers.

FIG. 9 (Table 3) is a table showing the conditions for a continuous running test (Example 2) wherein an external flaw is imparted to a coated optical fiber under the application of a tension, and the results of the above test.

BEST MODE FOR CARRYING OUT THE INVENTION

Hereinbelow, the present invention will be described in detail, with reference to the accompanying drawings as desired.

(Coated Optical Fiber)

The coated optical fiber which can be fabricated or can be subjected to the evaluation of (external) flaw resistance thereof according to the present invention, is not particularly limited, as long as the coated optical fiber has a structure comprising a light-transmitting fiber, and a resin coating layer disposed on the outer periphery of the light-transmitting fiber. In view of the balance between the reduction in the thickness of the entire coating layer, and the resistance of the coated optical fiber to microbending, the coating layer may preferably comprise at least two layers inclusive of a primary coating layer having a function of buffer layer (an inner layer having a relatively low hardness) and a secondary coating layer having a relatively high hardness (outer layer). Each of these primary and secondary coating layers may preferably comprise a polymer (particularly, an ultraviolet ray-curing (or hardening) resin).

Figure 1:
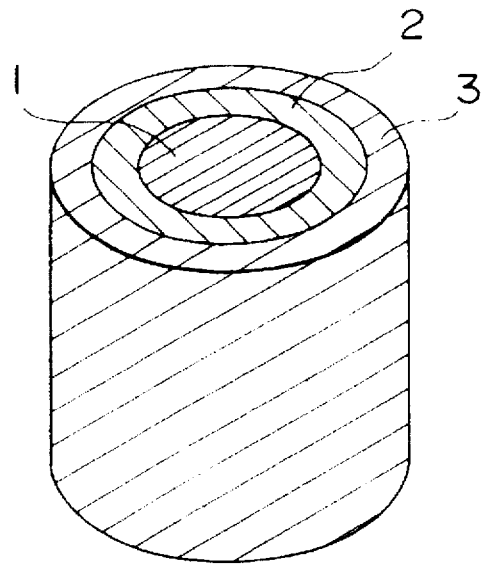
FIG. 1 is a partial schematic perspective view showing an example of the coated optical fiber strand which can be fabricated according to the present invention.

FIG. 1 is a partial schematic perspective view showing the structure of an specific embodiment of the coated optical fiber strand (or wire) which can be fabricated or can be subjected to the evaluation of the flaw resistance thereof according to the present invention.

Referring to FIG. 1, the coated optical fiber strand in this embodiment comprises: a light-transmitting fiber 1, a primary coating layer 2 disposed on the outer periphery of the fiber 1, and a secondary coating layer 3 disposed on the outer periphery of the primary coating layer 2. The light-transmitting fiber 1 may generally comprise a core (not shown) and a cladding (not shown) disposed on the outside of the core. In general, the light-transmitting fiber 1 has an outside diameter of 125 μm.

The thickness of the primary coating layer 2 may preferably be about 7–50 μm. The material constituting the primary coating layer 2 may preferably have a Young's modulus of about 0.04–0.30 kg/mm$^2$, more preferably about 0.05–0.20 kg/mm$^2$, particularly preferably about 0.07–0.15 kg/mm$^2$.

The thickness of the secondary coating layer 3 may preferably be about 5–40 μm. The material constituting the secondary coating layer 3 may preferably have a Young's modulus of about 10–200 kg/mm$^2$, more preferably about 50–180 kg/mm$^2$, particularly preferably about 120–180 kg/mm$^2$.

When the coated optical fiber having the structure as shown in FIG. 1 is used as a strand (or wire) for constituting an ultra-multi-strand optical fiber cable, the outermost layer may preferably have an outside diameter of 220 μm or less.

(Process or Means for Forming Optical Fiber)

The process or means for forming an optical fiber usable in the present invention is not particularly limited. From a viewpoint such that a resin coating layer is efficiently formed on the light-transmitting fiber so as to obtain a coated optical fiber, for example, a fiber drawing apparatus as shown in a schematic sectional view of FIG. 10 can suitably be used.

Figure 10:
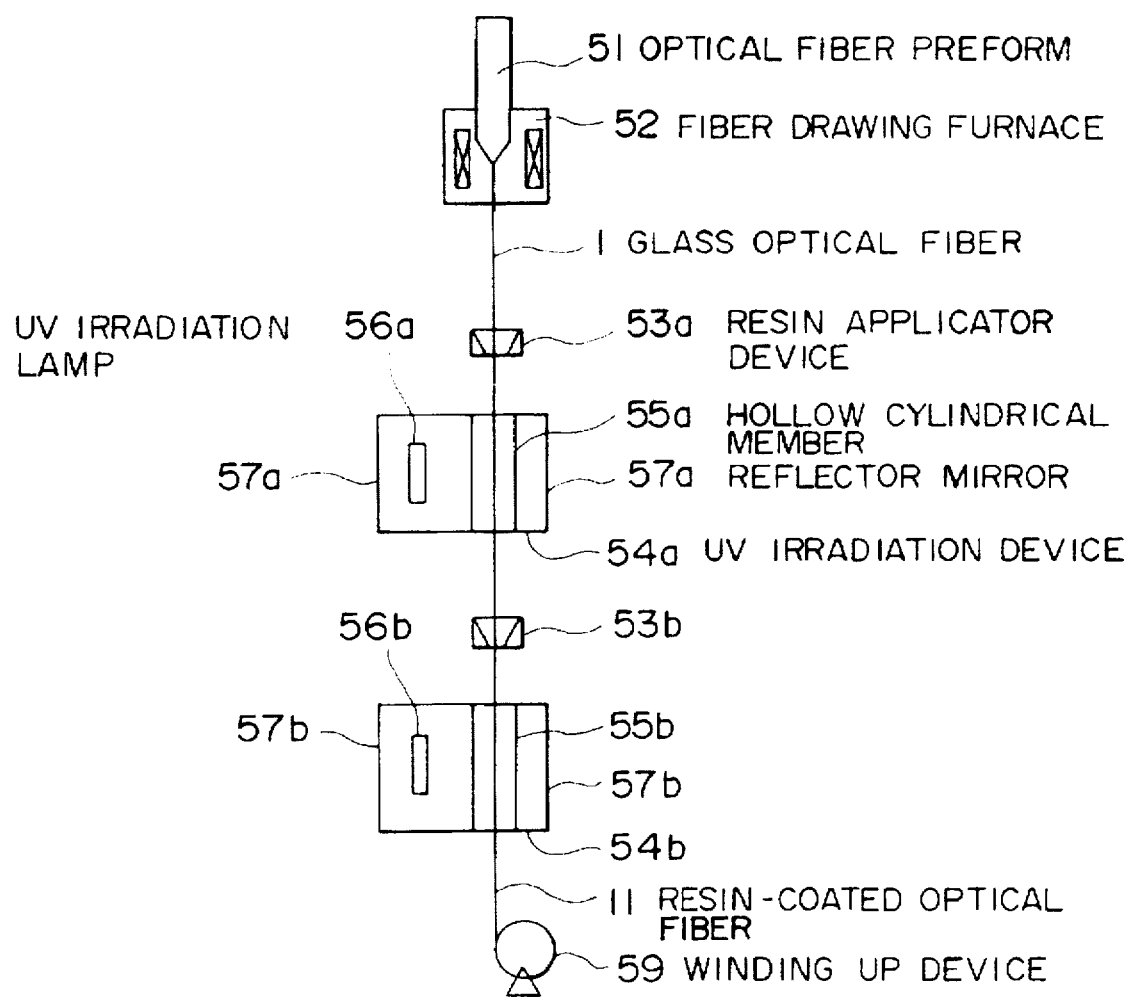
FIG. 10 is a schematic sectional view for illustrating a process (or an apparatus) for fabricating a coated optical fiber, which is usable in the present invention.

More specifically, referring to FIG. 10, an optical fiber preform 51 is subjected to fiber drawing by means of a fiber drawing furnace 52, thereby to obtain a light-transmitting glass fiber 1. Then, the resultant glass fiber 1 is passed through a first resin applicator device 53a, thereby to form a first application layer (not shown) comprising an ultraviolet ray-curing resin on the glass fiber 1. Thereafter, the fiber 1 is passed through a first ultraviolet ray irradiation device 54a to harden the above-mentioned first application layer, whereby a first coating layer 2 (FIG. 1) is formed on the fiber 1. The above-mentioned ultraviolet ray irradiation device 54a comprises: a hollow cylindrical member 55a through which the glass fiber 1 is to be passed, an ultraviolet lamp 56a for irradiating the application layer of the ultraviolet ray-curing resin with ultraviolet rays, and a reflector mirror 57a for reflecting the ultraviolet rays.

Subsequently, the resultant optical fiber 1 on which the above-mentioned first coating layer 2 has been formed is passed through a second resin applicator device 53b, thereby to form a second application layer (not shown) comprising an ultraviolet ray-curing resin on the fiber 1. Thereafter, the fiber 1 is passed through a second ultraviolet ray irradiation device 54b to harden the above-mentioned second application layer, to form a second coating layer 3 (FIG. 1) on the above-mentioned first coating layer 2, whereby a coated optical fiber 11 having a structure as shown in FIG. 1 is obtained. The above-mentioned ultraviolet ray irradiation device 54b comprises: a hollow cylindrical member 55b through which the glass fiber 1 is to be passed, an ultraviolet lamp 56b for irradiating the application layer of the ultraviolet ray-curing resin with ultraviolet rays, and a reflector mirror 57b for reflecting the ultraviolet rays.

Figure 2:
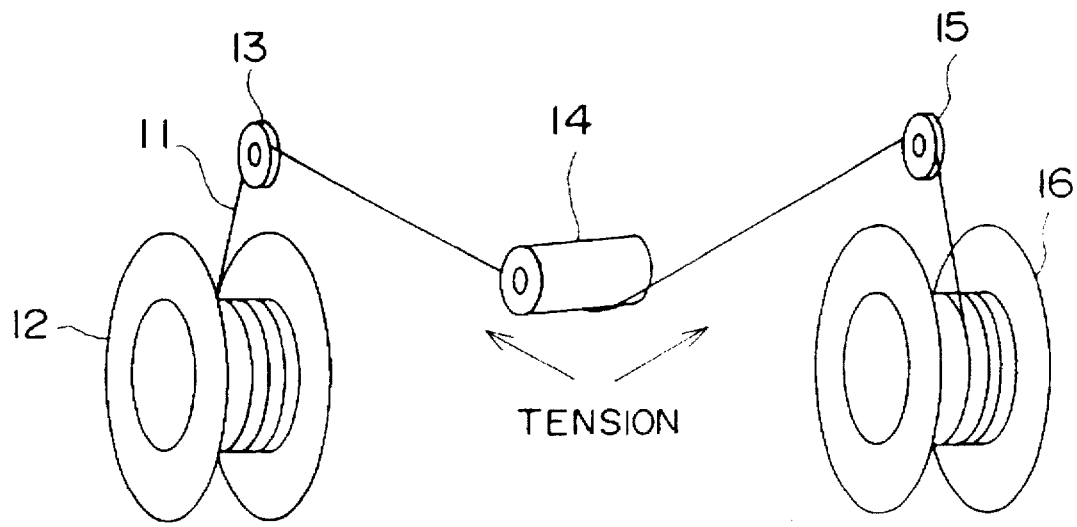
FIG. 2 is a partial schematic perspective view showing an example of the apparatus which is capable of imparting an external flaw to a coated optical fiber, and is usable in the apparatus or process for fabricating the coated optical fiber according to the preset invention.
Figure 6:
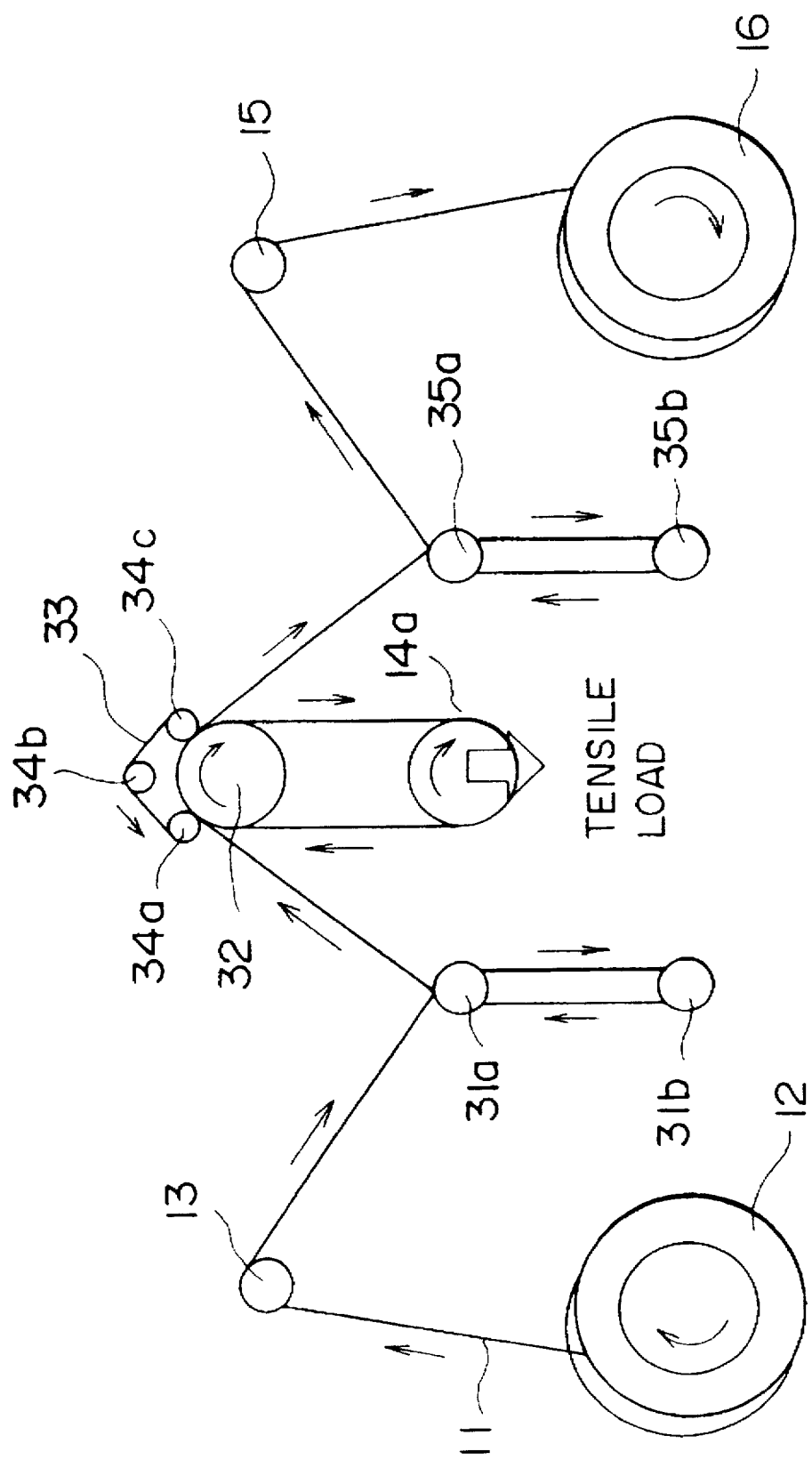
FIG. 6 is a partial schematic perspective view showing an example of the apparatus which is capable of continuously imparting an external flaw to a coated optical fiber under the application of a tension, and is usable in the apparatus or process for fabricating the coated optical fiber according to the present invention.

The coated optical fiber 11 which has been obtained in the above-mentioned manner is then wound up by a winding-up device 59. As desired, it is also possible to feed directly the thus obtained coated optical fiber 11 to a device as shown in FIG. 2 or 6 to be described hereinbelow so as to impart an external flaw to the coating layer of the coated optical fiber 11, instead of winding up the coated optical fiber 11 about the winding-up device 59. With respect to the details of the process or apparatus for forming the coated optical fiber 11, e.g., U.S. Pat. (USP) Nos. 5,268,984; 5,127,361; etc., may be referred to.

(Method of Imparting External Flaw)

An external flaw can be imparted to a coated optical fiber comprising a light-transmitting fiber, and a resin coating layer disposed on the outer periphery of the light-transmitting fiber in succession to the formation of the coated optical fiber. Alternatively, it is also possible that the thus formed coated optical fiber is once wound up about a reel, etc., and thereafter an external flaw is imparted to the coated optical fiber while the coated optical fiber is wound off from the reel.

FIG. 2 is a partial schematic perspective view showing an embodiment of the external flaw-imparting method usable in the present invention, wherein a coated optical fiber is once wound up about a reel, etc., and thereafter an external flaw is imparted to the coated optical fiber while the coated optical fiber is wound off from the reel.

Referring to FIG. 2, a coated optical fiber strand 11 to which an external flaw is to be imparted, is wound off from a feed reel 12 in a predetermined running speed, is passed over a pulley 13, and is then caused to contact a follower roller (external flaw-imparting means) 14 having an unevenness on its surface, whereby an external flaw is imparted the coating layer of the optical fiber strand. The optical fiber 11 to which the external flaw has been imparted, is then passed over a pulley 15, and is wound up about a winding-up reel 16.

The running speed of the optical fiber 11 is not particularly limited. However, in view of effective provision of an external flaw, the running speed may generally be 10 m/min. or more, more preferably about 40–210 m/min. The tension which is to be applied to the optical fiber 11 from the external flaw-imparting means 14 is not particularly limited. However, in view of the provision of an external flaw suitable for the quantitative evaluation of the flaw resistance, the tension may generally be 10 gram-weight or more, more preferably about 40–310 gram-weight.

(External Flaw-Imparting Means)

The external flaw-imparting means 14 comprises a body of revolution having an unevenness on its surface. In view of the reproducibility in the measurement of the flaw resistance, it is preferred that the external flaw-imparting means 14 does not substantially have a relative speed with respect to the running optical fiber 11 (i.e., only follows the running of the optical fiber 11).

The external flaw-imparting means 14 can comprise a body of revolution per se having an unevenness on its surface. However, in view of an advantage in the replacement thereof, etc., the external flaw-imparting means may preferably comprise a body of revolution (such as roller) and an abrasive material (such as commercially available sand paper) disposed on or bonded to the outer periphery of the body of revolution. The degree of the surface unevenness of the external flaw-imparting means 14 is not particularly limited, as long as it can impart an external flaw to the coated optical fiber 11. However, in view of the reproducibility in the provision of an external flaw, the degree of the surface unevenness of the external flaw-imparting means may preferably be about 10–50 µm, more preferably about 11.5 µm (#1000) to 40 µm (#320), when the surface unevenness is converted into the average particle size as defined in JIS R-6001.

(Measurement of Tensile Breaking Strength)

In the present invention, it is possible that an external flaw is imparted to a coated optical fiber in the above-described manner, and thereafter the tensile breaking strength of the coated optical fiber is measured. The tensile breaking strength may be measured in a separate step from the step of imparting the external flaw to the fiber, after the optical fiber 11 is once wound about the winding-up reel 16 (FIG. 2). Alternatively, as desired, it is also possible to measure the tensile breaking strength in succession to the provision of the external flaw.

The conditions for the measurement of the tensile breaking strength are not particularly limited, but for example, the following conditions may suitably be used.

Tensile breaking strength-measuring apparatus: "Tensilon" universal tensile testing machine (trade name: UTM-3-100, mfd. by Toyo Baldwin K.K.)

Distance between gage marks: 300 mm

Pulling speed: 100 mm/min.

Figure 3:
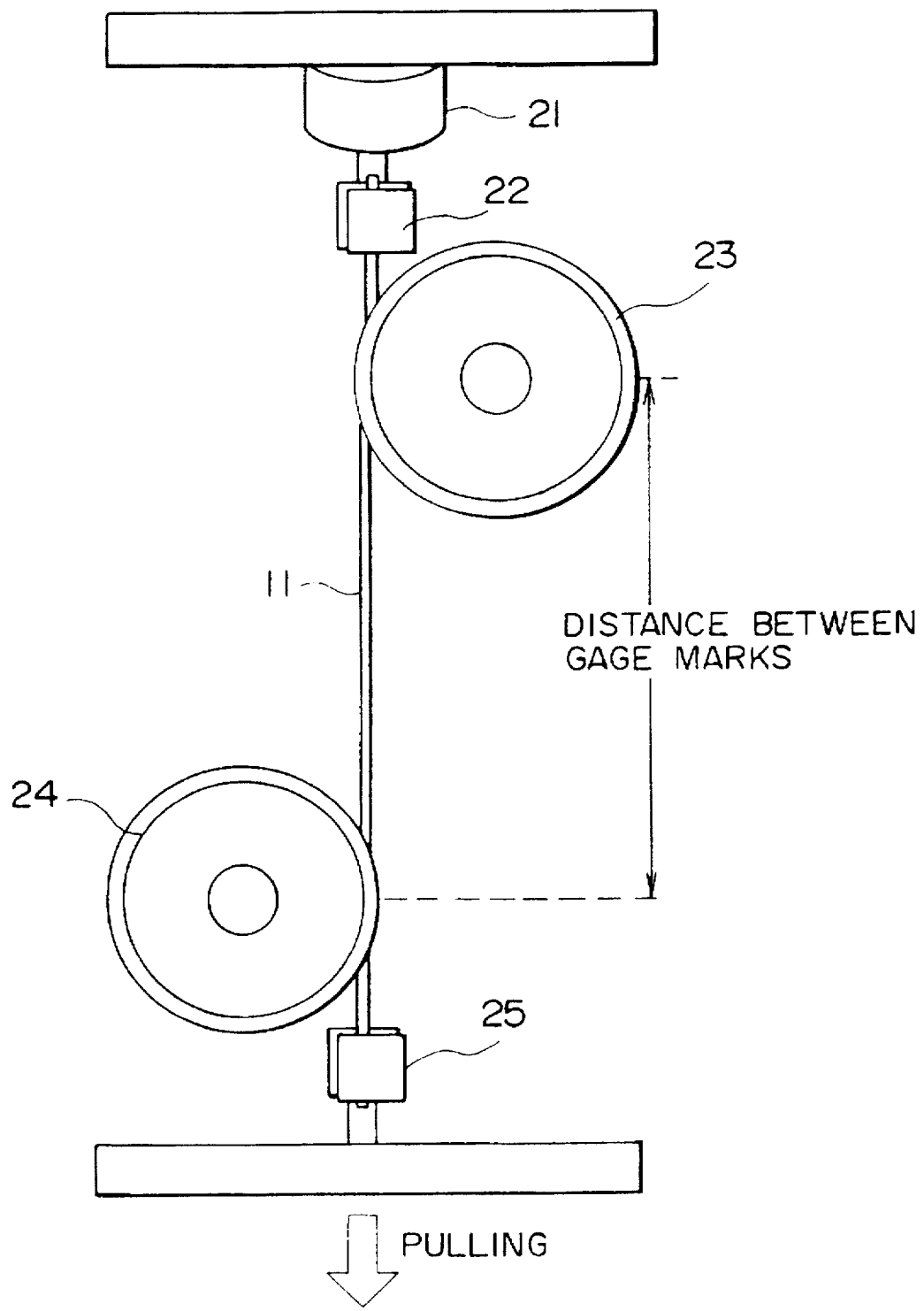
FIG. 3 is a partial schematic perspective view showing an example of the apparatus which is capable of measuring the tensile breaking strength of a coated optical fiber, and is usable in the apparatus or process for fabricating the coated optical fiber according to the preset invention.

FIG. 3 is a partial schematic perspective view showing an embodiment of the measurement of the tensile breaking strength according to the present invention. Referring to FIG. 3, one end of a coated optical fiber 11 (of which tensile breaking strength is to be measured) which has been wound about upper and lower mandrels 23 and 24 (rubber is wound about the surface of the mandrel), respectively, so that one turn of the fiber 11 is wound about each mandrel, is sandwiched between members constituting an air chuck 22 connected to a load cell 21. The other end of the optical fiber 11 is sandwiched between members constituting another air chuck 25. At the time of the measurement of the tensile breaking strength, for example, it is possible that the lower air chuck 25 is pulled down at a predetermined pulling speed, and the load at the time at which the optical fiber 11 is broken is measured by means of the load cell 21, thereby to determine the load (tensile breaking strength) at the time of the fiber breaking.

(Strength Retention Ratio)

According to the present inventor's investigation, in the coated optical fiber comprising a coating layer including at least two layers as shown in FIG. 1, in view of the flaw resistance thereof, the ratio $R_S=S_A/S_O$ (hereinafter, referred to as "strength retention ratio") wherein $S_A$ is the median value of the breaking strength of the fiber after the provision of an external flaw, and $S_O$ is the median value of the breaking strength of the fiber before the provision of the external flaw, may preferably be 0.90 or more, more preferably 0.95 or more (particularly preferably 0.98 or more).

When such a strength retention ratio $R_S$ is measured, it is preferred to measure the median value of the breaking strength after the provision of the external flaw ($S_A$), and the median value of the breaking strength before the provision of the external flaw ($S_O$) in the following manner.

Thus, a coated optical fiber 11 (before the provision of an external flaw) is used as such, and is subjected to the measurement of a tensile breaking strength as shown in FIG. 3 (distance between gage marks=300 mm, pulling speed= 100 mm/min.). Then, an external flaw is imparted to the surface of the above-mentioned coating layer by using a roller 14 (outside diameter=11 mm) to which a sand paper (grade: #400) has been bonded, as an external flaw-imparting means, under the application of a tension of 100 gram-weight, while the coated optical fiber 11 (before the provision of the external flaw) is caused to run (running speed=100 m/min.). Thereafter, the resultant coated optical fiber is subjected to the measurement of a tensile breaking strength in the same manner as described above (distance between gage marks=300 mm, pulling speed=100 mm/min.). In view of the reproducibility of the resultant data, it is preferred that such measurements are repeated 10 times or more (more preferably, 20 times or more) so as to determine the median value of the breaking strength after the provision of the external flaw ($S_A$), and the median value of the breaking strength before the provision of the external flaw ($S_O$), whereby the above-mentioned strength retention ratio $R_S$ is determined on the basis of these values thus obtained.

(Provision of External Flaw Under Application of Tension)

FIG. 6 is a schematic perspective view showing an embodiment of the external flaw-imparting method (or external flaw-imparting apparatus) which is capable of continuously imparting an external flaw to a coated optical fiber under the application of a tension to the coated optical fiber. In a case where the external flaw-imparting method as shown in FIG. 6 is used, it is possible to evaluate the above-mentioned tensile breaking strength sequentially and substantially simultaneously with the provision of the external flaw, whereby the efficiency in the flaw resistance evaluation is improved. Further, in such a case, it is easy to evaluate the substantially entire length of the fiber which has been wound about a feed reel, etc.

Referring to FIG. 6, a coated optical fiber strand 11 to which an external flaw is to be imparted is wound off from a feed reel 12 at a predetermined running speed, is then passed over a pulley 13, and is once wound around a pair of rollers 31a and 31b (so-called "step roller"). The pair of rollers 31a and 31b have a function of reducing or absorbing variation in the rate of the feed of the fiber 11 (feed rate) and/or variation in the tension to be applied to the fiber 11, to a certain extent. In order to effectively exhibit such a performance of reduction and/or absorption, it is preferred to wind the fiber 11 around the pair of rollers 31a and 31b so as to provide about three to four turns (about three to four folds) of the fiber.

After the fiber 11 is passed over the above-mentioned pair of rollers 31a and 31b, the fiber 11 reaches a fiber-driving unit which comprises a capstan roller 32 for driving the fiber 11, and a capstan belt 33 which is disposed opposite to the capstan roller 32 and is wound around rollers 34a, 34b and 34c. In the fiber-driving unit, the fiber 11 is driven while being sandwiched between the above-mentioned capstan roller 32 and capstan belt 33.

After the fiber 11 is passed over the capstan roller 32, the fiber 11 is caused to contact an external flaw-imparting roller (external flaw-imparting means) 14a having an unevenness on its surface, whereby an external flaw is imparted to the coating layer thereof. In view of a balance between the provision of the external flaw to the fiber 11 and the driving of the fiber 11, it is preferred that the fiber 11 is wound around the circumference of these capstan roller 32 and external flaw-imparting roller 14a so as to provide about two turns of the fiber 11, whereby the external flaw is mainly imparted to the fiber 11 at the time of the first contact between the fiber and the external flaw-imparting roller, and the fiber 11 is mainly driven at the time of the second contact between the fiber and the external flaw-imparting roller.

A predetermined tension is applied to the above-mentioned external flaw-imparting roller 14a by a tension-applying means (not shown). Further, an unshown tension meter (tension-monitoring means) is connected to the external flaw-imparting roller 14a, whereby the tension applied to the roller 14a can be monitored.

The optical fiber 11 to which the external flaw has been imparted is again passed over the fiber-driving unit (comprising the capstan roller 32 and the capstan belt 33 disposed opposite to each other), and then is wound around a pair of step rollers 35a and 35b, which have a function similar to that of the above-mentioned step rollers 31a and 32b. It is preferred to wind the fiber 11 around the pair of rollers 35a and 35b so as to provide about three to four turns (about three to four folds) of the fiber.

After the fiber 11 is passed over the above step rollers 35a and 35b, the fiber 11 is passed over a pulley 15, and then is wound up around a winding-up reel 16.

The running speed of the optical fiber 11 in the embodiment of FIG. 6 is not particularly limited. However, in view of a balance between effective provision of the external flaw and the reproducibility in the strength evaluation, the running speed may generally be 50 m/min. or more, more preferably about 100–600 m/min. (particularly preferably about 300–600 m/min.). The tension to be applied to the optical fiber 11 from the external flaw-imparting means 14a is not particularly limited. In view of the provision of the external flaw suitable for the quantitative evaluation of the flaw resistance, the tension may generally be 100 gram-weight or more, more preferably about 500–2000 gram-weight (particularly preferably about 700–2000 gram-weight).

As the above-mentioned external flaw-imparting means 14a, it is possible to use the same as the external flaw-imparting means 14 used in the embodiment of FIG. 2.

Hereinbelow, the present invention will be described in more detail with reference to specific Examples.

<EXAMPLE>

Example 1

On a light-transmitting fiber (normal single-mode, outside diameter=125 μm) comprising a core and a cladding disposed on the circumference of the core, there were disposed a primary coating layer comprising a soft polymer (ultra-violet ray-curing urethane-acrylate resin, thickness: 12–28 μm), and a secondary coating layer comprising a hard polymer (ultra-violet ray curing urethane-acrylate resin, thickness: 4–31 μm), thereby to obtain 16 kinds of resin-coated fibers (FIG. 7 (Table 1)) each having a structure as shown in FIG. 1.

Each of the thus obtained 16 kinds of resin-coated fibers (FIG. 1 (Table 7)) was subjected to the measurement of a tensile breaking strength thereof (before the provision of an external flaw) 20 times by means of a tensile breaking strength-measuring apparatus as shown in FIG. 3 under the following measurement conditions, and then, the median value $S_O$ of the measurement values was determined.

Tensile breaking strength-measuring apparatus: "Tensilon" universal tensile testing machine (trade name: UTM-3-100, mfd. by Toyo Baldwin K.K.)

Distance between gage marks: 300 mm

Pulling speed: 100 mm/min.

Then, an external flaw was imparted to each of the above-mentioned 16 kinds of the resin-coated fibers by using an apparatus as show in FIG. 2 under the following conditions. At the time of the provision of the external flaw, a conventional optical fiber-screening rewinding machine (trade name: Rewinding Machine, mfd. by Nisshin K.K.) was used. Each of five kinds of sand papers having JIS grades of #320, #400, #600, #800 and #1000 was bonded to the surface of a guiding roller 14 disposed immediately before a take-up bobbin 16, and the guiding roller 14 was so disposed that the guiding roller was caused to contact the coated optical fiber 11 under a tension of 100 g. By use of the rewinding machine in such a state, an amount (about 100 m) of the coated optical fiber 11 required for the tensile test was rewound.

More specifically, a flaw was imparted to the surface of the resin coating layer of the above-mentioned optical fiber 11 under a tension of 100 gram-weight by use of the roller (outside diameter=11 mm) 14 to which the sand paper having the grade (average particle size) as shown in FIG. 8 (Table 2) had been bonded, while the coated optical fiber 11 (before the provision of an external flaw) was caused to run as shown in FIG. 2 at a running speed of 100 mm/min. Thereafter, the coated optical fiber (after the provision of the external flaw) was subjected to the measurement of the tensile strength (distance between gage marks: 300 mm, pulling speed: 100 mm/min.) 20 times in the same manner as described above by means of the apparatus as shown in FIG. 3, thereby to obtain a median value $S_A$ thereof.

Based on the thus measured median value of the breaking strength, the strength retention ratio ($R_S$) was determined according to the following equation.

$$R_S = S_A/S_O \quad (1)$$

Figure 4:
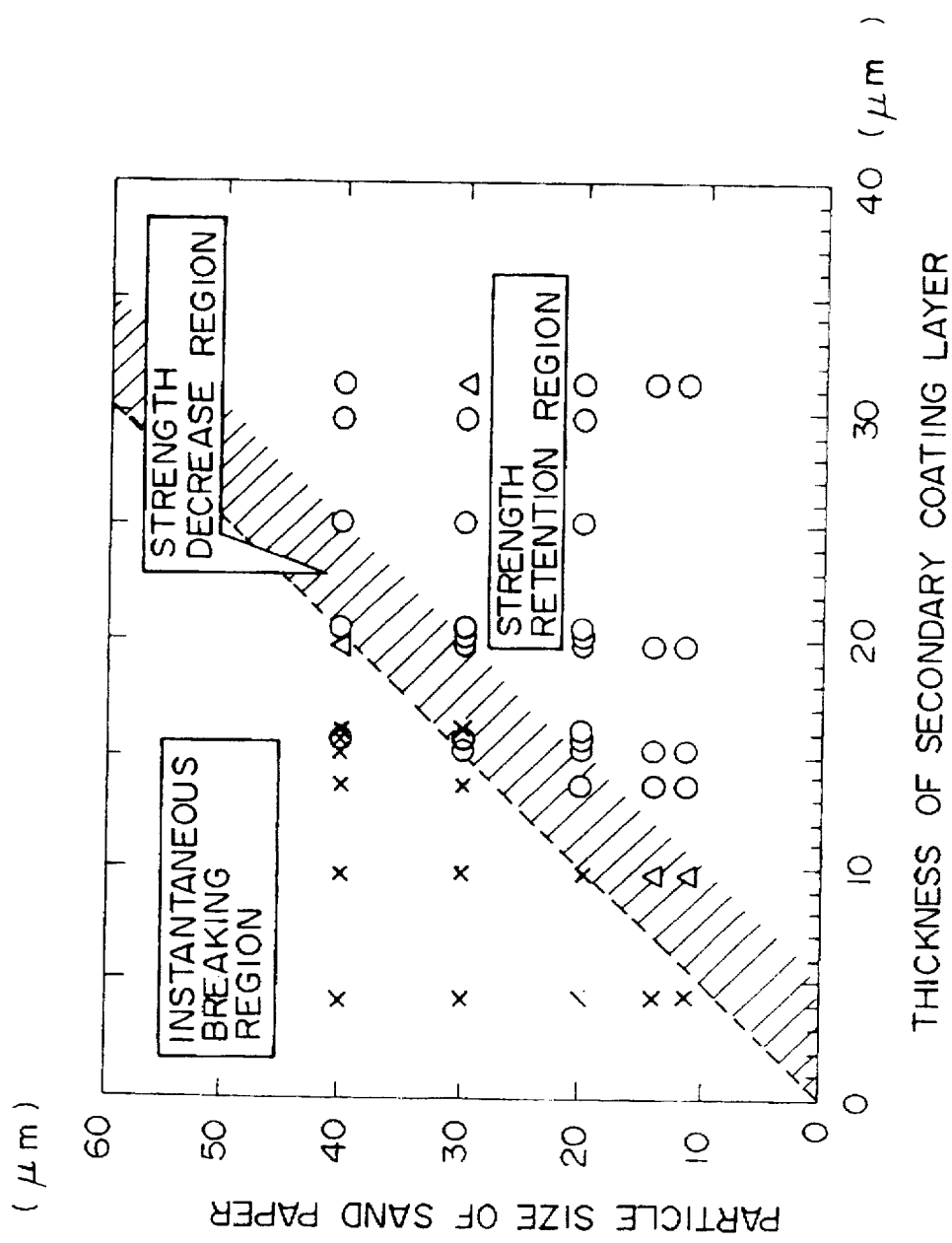
FIG. 4 is a graph showing a relationship between the thickness of a secondary coating layer (abscissa) and the diameter of abrasive particles constituting a sand paper (ordinate), in view of the strength retention ratios which have been measured in the present invention.
Figure 5:
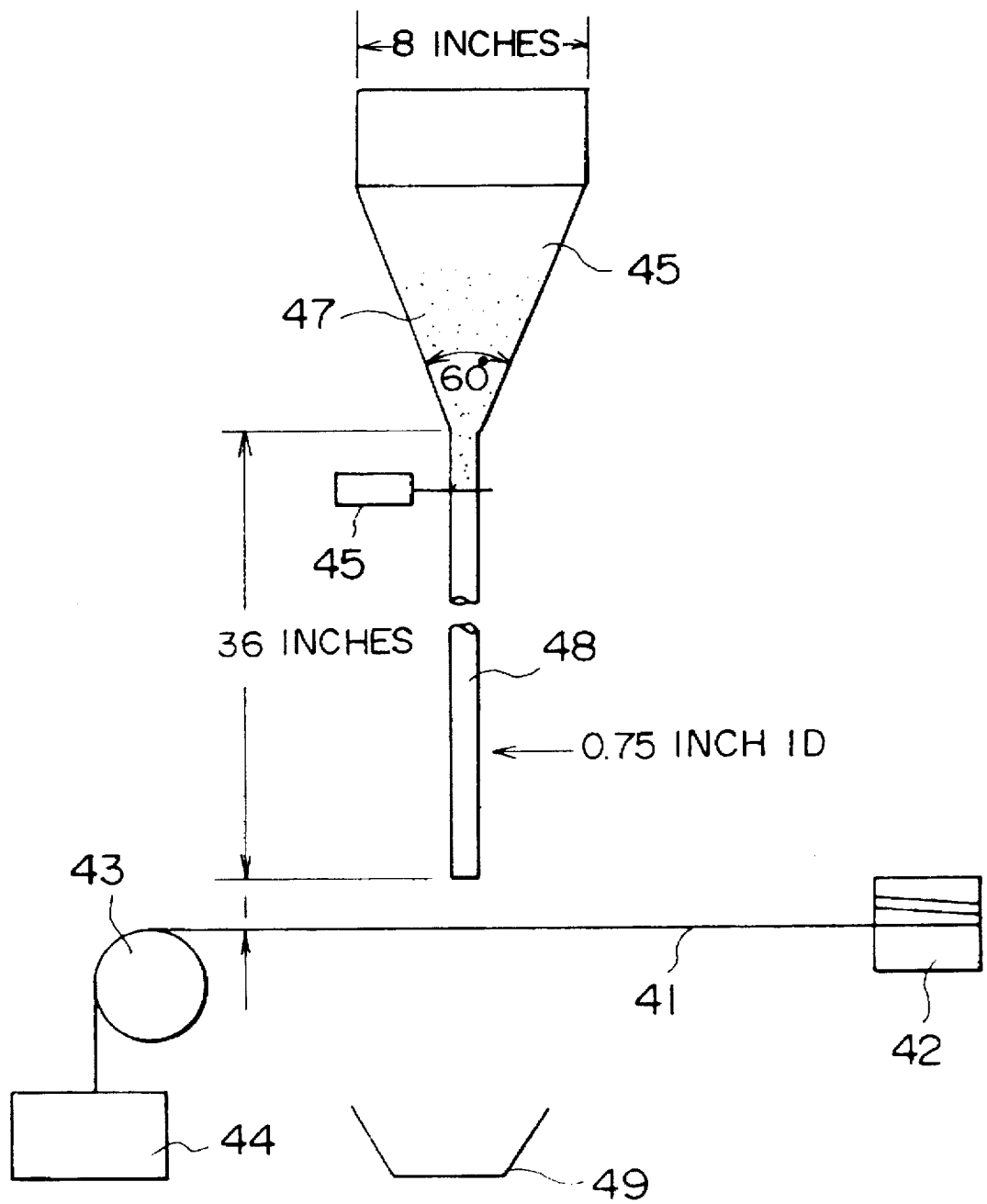
FIG. 5 is a schematic sectional view for illustrating a conventional method of measuring the flaw resistance of a coated optical fiber.

Based on the above-mentioned measurement results, there was investigated a relationship between the thickness of the secondary coating layer (μm, abscissa) and the particle size of the sand paper (μm, ordinate) in view of the strength retention ratio $R_S$. The results are shown in the graph of FIG. 4. In FIG. 4, a white circle mark (○) indicates that the strength retention ratio $R_S$ is substantially 100% (98% or more), a triangle mark (△) indicates that $R_S$ is less than 98%, and a cross mark (X) indicates that the fiber was broken when the external flaw was imparted to the fiber.

Based on the above measurement results, it was found that the critical thickness ($T_S$) of the secondary coating layer at the time of the fiber breaking was closely related to the average particle size ($D_A$) of the abrasive particles constituting the sand paper, and that the condition for the fiber breaking was expressed by the following equation (2).

$$D_A > 2T_S \quad (2)$$

In addition, it was also found that at the time of the measurement of the strength retention ratio $R_S$ of the coated fiber, for example, a sand paper having a JIS grade of #400 (average particle size of abrasive particles $D_A$=30 μm) was suitably usable, and that the thickness of the primary coating layer did not affect the flaw resistance of the fiber relatively, as compared with that of the thickness of the secondary coating layer.

Example 2

On a light-transmitting fiber (normal single-mode, outside diameter=125 μm) comprising a core and a cladding disposed on the circumference of the core, there were disposed a primary coating layer comprising a soft polymer (ultra-violet ray-curing urethane-acrylate resin, thickness: 12–38 μm), and a secondary coating layer comprising a hard polymer (ultra-violet ray curing urethane-acrylate resin, thickness: 10–31 μm), thereby to obtain 5 kinds of resin-coated fibers (FIG. 9 (Table 3)) each having a structure as shown in FIG. 1.

Each of the thus obtained 5 kinds of resin-coated fibers had the following Young's moduli of the primary/secondary coating layer, and the following coating diameters of the primary/secondary coating layer.

| <No.> | Young's modulus (primary/secondary coat) | Coating diameter (primary/secondary coat) |
| --- | --- | --- |
| 1 | 0.10/60 kg/mm² | diameter 200/250 μmφ |
| 2 | 0.10/60 kg/mm² | diameter 180/240 μmφ |
| 3 | 0.10/60 kg/mm² | diameter 170/220 μmφ |
| 4 | 0.10/60 kg/mm² | diameter 160/200 μmφ |
| 5 | 0.10/60 kg/mm² | diameter 150/180 μmφ |

With respect to each of the thus obtained 5 kinds of the resin-coated fibers (FIG. 9 (Table 3)), it was determined whether each fiber was broken or not by means of a tensile breaking strength-measuring apparatus as shown in FIG. 6 under the following measurement conditions.

Running speed of fiber: 300 m/min.

Diameter of capstan roller 32: 240 mm

Capstan belt 33: thickness of 3.5 mm (mfd. by Nihon Jeagling K.K.)

External flaw-imparting roller 14a: 240 mm in diameter

Surface roughness of external flaw-imparting roller 14a: The surface was subjected to sandblasting treatment by using iron particles so that the surface was caused to have the same surface unevenness level as that of a sand paper corresponding to #400.

Tension applied to external flaw-imparting roller 14a: 500–2000 gram-weight

The evaluation results obtained in the above-described manner are shown in FIG. 9 (Table 3). In this FIG. 9 (Table 3), a mark "○" denotes a fiber which was not broken when it was subjected to continuous fiber running of 1.0 km or more, and a mark "X" denotes a fiber which was broken when it was subjected to continuous fiber running less than 1.0 km.

In the evaluation of the continuous external flaw-provision/fiber strength, the lot of the fiber (fiber denoted by the mark "○") was judged to be good fibers having a good external flaw resistance.

Industrial Applicability

As described hereinabove, the present invention provides a process for fabricating a coated optical fiber, comprising:

forming a coated optical fiber comprising a light-transmitting fiber and a resin coating layer disposed on the outer periphery of the light-transmitting fiber;

imparting an external flaw to the surface of the resin coating layer while running the coated optical fiber, and then subjecting the coated optical fiber to the measurement of a tensile breaking strength thereof; and selecting, as a non-defective product, the fiber having a strength retention ratio $R_S = S_A/S_O$ of 0.98 or more, wherein $S_A$ is the median value of the tensile breaking strength after the provision of the external flaw, and $S_O$ is the median value of the tensile breaking strength before the provision of the external flaw.

The present invention also provides a process for fabricating a coated optical fiber, comprising:

forming a coated optical fiber comprising a light-transmitting fiber and a resin coating layer disposed on the outer periphery of the light-transmitting fiber;

imparting an external flaw to the surface of the resin coating layer under the application of a tension while running the coated optical fiber; and selecting, as a non-defective product, the fiber which has traveled a predetermined length without causing the breaking thereof.

In the above-mentioned process for fabricating a coated optical fiber according to the present invention, while a coated optical fiber to be measured is caused to run, an external flaw is instantaneously imparted to the coating layer of the optical fiber, and thereafter, the breaking strength of the fiber is measured. Accordingly, the amount of the optical fiber to be subjected to the test may be minimized, and the period of time required for the measurement is also short. As a result, the process according to the present invention may be utilized in a production line for an optical fiber very easily.

In addition, in the present invention, since the external flaw is continuously imparted to the coating layer, it is very easy to statistically process the resultant measurement data.

We claim:

1. A process for fabricating a coated optical fiber, comprising:

forming a coated optical fiber comprising a light-transmitting fiber and a resin coating layer disposed on the outer periphery of the light-transmitting fiber;

imparting an external flaw to the surface of the resin coating layer while running the coated optical fiber, and then subjecting the coated optical fiber to the measurement of a tensile breaking strength thereof; and selecting, as a non-defective product, the fiber having a strength retention ratio $R_S = S_A/S_O$ of 0.98 or more, wherein $S_A$ is the median value of the tensile breaking strength after the provision of the external flaw, and $S_O$ is the median value of the tensile breaking strength before the provision of the external flaw.

2. A process for fabricating a coated optical fiber, comprising:

forming a coated optical fiber comprising a light-transmitting fiber and a resin coating layer disposed on the outer periphery of the light-transmitting fiber;

imparting an external flaw to the surface of the resin coating layer under the application of a tension while running the coated optical fiber; and selecting, as a non-defective product, the fiber which has traveled a predetermined length without causing the breaking thereof.

3. A process for fabricating a coated optical fiber according to claim 1, wherein a body of revolution having an unevenness on its surface is caused to contact the surface of the coated optical fiber which is continuously caused to run under the application of a tension, thereby to impart the external flaw to the coated optical fiber.

4. A process for fabricating a coated optical fiber according to claim 3, wherein the body of revolution comprises a roller having a surface to which particles having a predetermined size have been attached.

5. A process for fabricating a coated optical fiber according to claim 3, wherein the body of revolution comprises a roller having a surface to which a sand paper has been bonded.

6. A process for fabricating a coated optical fiber according to claim 2, wherein the coated optical fiber is caused to run at a linear velocity of 100 m/min. to 600 m/min.

7. A process for fabricating a coated optical fiber according to claim 2, wherein the tension is 500–2000 gram-weight.

8. A process for fabricating a coated optical fiber according to claim 7, wherein the tension is 2000 gram-weight, and the fiber which has continuously traveled 1.0 km or more without causing the breaking thereof is selected as a non-defective product.

9. A process for fabricating a coated optical fiber according to claim 2, wherein a body of revolution having an unevenness on its surface is caused to contact the surface of the coated optical fiber which is continuously caused to run under the application of a tension, thereby to impart the external flaw to the coated optical fiber.

10. A process for fabricating a coated optical fiber according to claim 9, wherein the body of revolution comprises a roller having a surface to which particles having a predetermined size have been attached.

* * * * *